F. H. BUSH.
INDICATOR FOR SHOWING THE TIME OF ADJUSTMENT OF BAROMETERS.
APPLICATION FILED JULY 2, 1910.

998,230.

Patented July 18, 1911.

Fig. 4ᵃ.

WITNESSES
W. P. Burk
L. Najek

INVENTOR
Frank Henry Bush
BY Wm. Wallace White
ATTY.

COLUMBIA PLANOGRAPH CO., WASHINGTON, D. C.

UNITED STATES PATENT OFFICE.

FRANK HENRY BUSH, OF LONDON, ENGLAND.

INDICATOR FOR SHOWING THE TIME OF ADJUSTMENT OF BAROMETERS.

998,230.

Specification of Letters Patent.

Patented July 18, 1911.

Application filed July 2, 1910. Serial No. 570,076.

*To all whom it may concern:*

Be it known that I, FRANK HENRY BUSH, subject of the King of Great Britain, residing at 4 Park Place, St. James, London, S. W., England, have invented new and useful Improvements in Indicators for Showing the Time of Adjustment of Barometers, of which the following is a specification.

This invention relates to improvements in means for representing on the dial of a barometer of the type in which the barometric indication is effected by the angular position of a pointer, a temporary record of a previous observation together with an indication of the day and moment thereof on and at which the observation was recorded.

The method of making the record according to this invention may be employed in addition to or as a substitute for that commonly employed in which a hand-operated index finger is pivotally mounted concentrically with the glass cover of the dial.

According to the present invention a rotatable index is adapted to be brought into co-incidence with the atmospheric-pressure-operated pointer and display a variable record of the day or moment of time when the co-incidence was effected.

On the accompanying drawing are shown some forms of construction embodying the above described invention.

Figure 1:
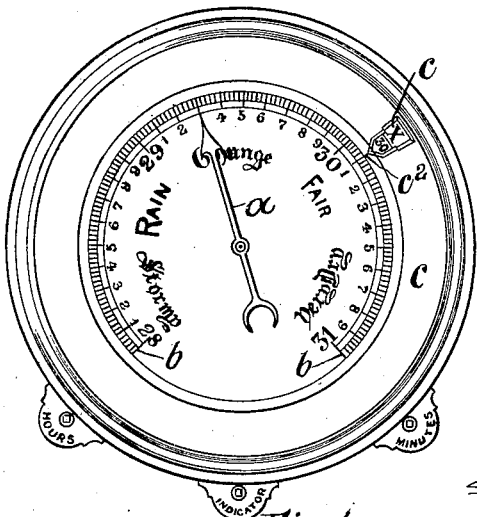
Figure 3:
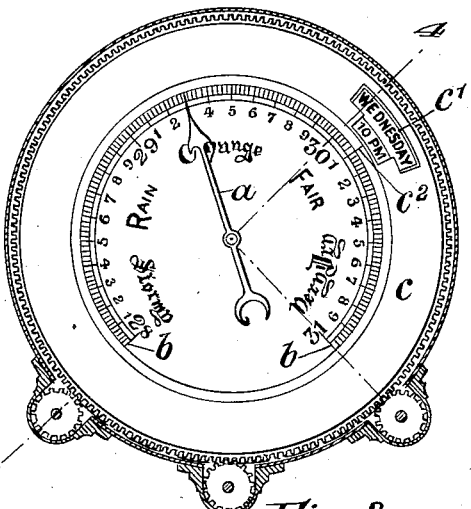
Figure 2:
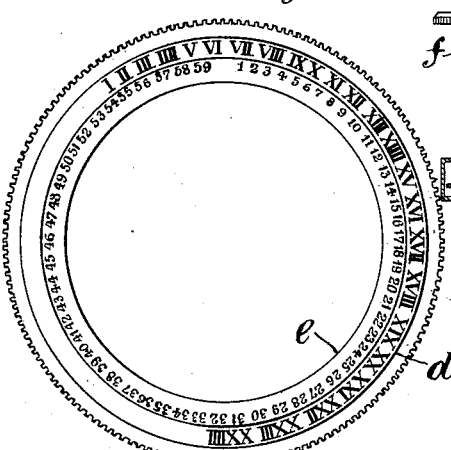
Figure 4:
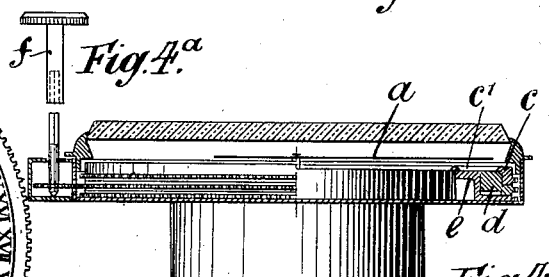
Figure 6:
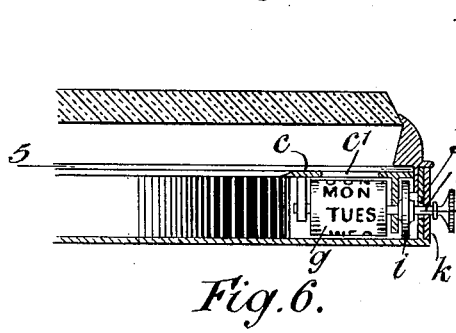
Figure 5:
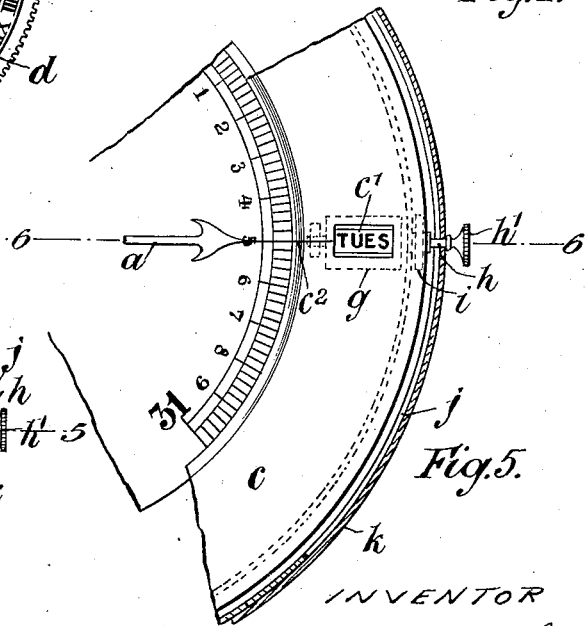

In this drawing:—Figure 1 shows in front elevation a record in terms of the hour and minute at which the index was brought into co-incidence with the pointer Fig. 2 being a plan of the annular rings which carry the hour and minute figures. Fig. 3 is a view similar to that of Fig. 1 but having parts broken for the sake of clearness and shows an indication of the time of record in terms of the hour of the day and day of the week. Fig. 4 is a part sectional elevation taken on the line 4—4 of Fig. 3 showing the mechanism for operating the recording index. Fig. 4ᵃ shows in elevation a detached operating-key, and Fig. 5 shows on an enlarged scale a part sectional plan taken along the line 5—5 of Fig. 6 of a portion of an alternative construction for exhibiting the record. Fig. 6 is a corresponding sectional elevation taken along the line 6—6 of Fig. 5.

This drawing represents the invention as applied to an aneroid barometer.

In the above mentioned figures, $a$ is the pointer and $b$ the graduated dial of an ordinary aneroid barometer whereby the pressure of the atmosphere at any moment is indicated. Surrounding the dial is a rotatably mounted annular plate $c$ formed with an aperture $c^1$ therein and provided with an index mark $c^2$.

Referring to Figs. 1 and 4, there are provided, beneath the plate $c$, two separately rotatable rings $d$ and $e$ of which the outer ring $d$ carries Roman numerals I–XXIIII which represent the twenty-four hours of the day, mid-night being denoted by a blank, the inner ring $e$ carrying numerals 1–59 signifying all but the last of the completed minutes of each hour, the last being denoted by a blank. Instead of employing numerals ranging up to 24, numerals ranging up to 12 only may be used in duplicate, one set being distinguished by the interposition of the letters A. M. between each hour expression, and the other set having the letters P. M. correspondingly interposed. To enable the disk $c$ and rings $d$ $e$ to be independently set at any desired angular position each is provided with a circular toothed rack and operating pinion any one of which latter can be separately rotated by a milled-headed key $f$ shown detached in Fig. 4ᵃ.

The method of operation is as follows:— When it is desired to record the barometric pressure the plate $c$ is rotated into a position at which the index mark $c^2$ co-incides with the pointer and then the rings $d$ and $e$ are rotated until the hour of the day and minute of the hour at which the observation was recorded show through the aperture $c^1$.

The construction shown in Fig. 3 is like that above described except that the date of record instead of being expressed by the hour and minute of a day is denoted by the hour of the day and the day of the week.

In Figs. 5 and 6 a modified construction is shown in which the plate $c$, formed with the aperture $c^1$, carries a drum $g$ rotatably mounted beneath the aperture, which drum, is marked with abbreviations of the seven days of the week, either of which by means of the milled-head $h^1$ on the protruding extremity of the drum-spindle $h$ can be presented at the aperture. The plate $c$ and the drum $g$ carried thereon, are mounted on a plurality of rollers of which $i$ is one, thus enabling the plates to be easily rotated into any desired position. To permit of the angular displacement a slotway $j$ is formed in the side of the case around a sufficient portion of its periphery to permit the spindle $h$ to take any position requisite to place the index mark $c^2$ in co-incidence with the pointer $a$ and, to cover the slotway and preclude the admission of dust to the interior of the case, a loose ring $k$ surrounds the case which ring is rotated with the plate $c$, the displacing effort being applied to the milled head $h^1$ of the protruding spindle of the drum $g$. In the construction shown only the day of the week on which the observation was made is placed on record but by a convention a definite hour of the day can be associated therewith.

I claim,

1. A barometer comprising a fixed graduated dial, a pivotally mounted pointer, an index inscribed with a plurality of periods of time pivotally mounted concentric with said pointer, means for setting said index in co-incidence with said pointer and means for varying the reading of said index.

2. A barometer comprising a fixed graduated dial, a pivotally mounted pointer, a pivotally mounted annular plate formed with an aperture therein, an index inscribed with a plurality of periods of time rotatably mounted relatively to said aperture, means for setting said aperture in co-incidence with said pointer and means for setting said index relatively to said aperture.

3. A barometer comprising a fixed graduated dial, a pivotally mounted pointer, a pivotally mounted annular plate formed with an aperture therein, a plurality of annular plates each inscribed with a plurality of periods of time, rotatably mounted relatively to said aperture, means for setting said aperture in co-incidence with said pointer and means for setting each said inscribed plate relatively to said aperture.

In testimony whereof I have signed my name to this specification in the presence of two subscribing witnesses.

FRANK HENRY BUSH.

Witnesses:
R. A. SMITH,
H. D. JAMESON.

Copies of this patent may be obtained for five cents each, by addressing the "Commissioner of Patents, Washington, D. C."